US007463012B2

(12) United States Patent
Mottola

(10) Patent No.: US 7,463,012 B2
(45) Date of Patent: Dec. 9, 2008

(54) BANDGAP REFERENCE CIRCUITS WITH ISOLATED TRIM ELEMENTS

(75) Inventor: Michael J. Mottola, San Jose, CA (US)

(73) Assignee: Micrel, Incorporated, San Jose, CA (US)

( * ) Notice: Subject to any disclaimer, the term of this patent is extended or adjusted under 35 U.S.C. 154(b) by 246 days.

(21) Appl. No.: 11/561,875

(22) Filed: Nov. 20, 2006

(65) Prior Publication Data

US 2008/0116874 A1 May 22, 2008

(51) Int. Cl.
*G05F 3/16* (2006.01)
*G06F 1/10* (2006.01)

(52) U.S. Cl. ........................ 323/313; 323/315; 327/539

(58) Field of Classification Search ................. 323/312, 323/313, 315–317, 907; 327/530, 534, 535, 327/538–543

See application file for complete search history.

(56) References Cited

U.S. PATENT DOCUMENTS 5,325,045 A * 6/1994 Sundby ...................... 323/313
5,963,105 A * 10/1999 Nguyen ...................... 331/176
6,075,407 A * 6/2000 Doyle ........................ 327/539
6,225,796 B1 * 5/2001 Nguyen ...................... 323/313
6,426,669 B1 * 7/2002 Friedman et al. ............ 327/539
6,590,372 B1 * 7/2003 Wiles, Jr. .................... 323/316
7,164,259 B1 * 1/2007 Megaw et al. ............... 323/313

* cited by examiner

*Primary Examiner*—Matthew V Nguyen
(74) *Attorney, Agent, or Firm*—Bever, Hoffman & Harms, LLP; Patrick T. Bever

(57) ABSTRACT

A bandgap reference circuit utilizes differential transistors to generate a temperature-independent bandgap voltage. In place of conventional trim elements that are connected in parallel to and adjust the resistance values of the bandgap reference circuit, current control circuits are placed in the current paths passing through the differential transistors (i.e., connected to the critical nodes located at the terminals of the differential transistors). Each current control circuit includes a resistive "trim" element (e.g., a zener diode) and associated trim pads that are separated from the critical nodes (i.e., the terminals of the differential transistors) by isolation transistors such that, during a trim/test procedure, the stray capacitances introduced by trim/test equipment probes are prevented from altering the performance of the bandgap reference circuit. In one embodiment, a current control circuit is connected to the critical node connected to the base of at least one of the differential transistors.

11 Claims, 6 Drawing Sheets

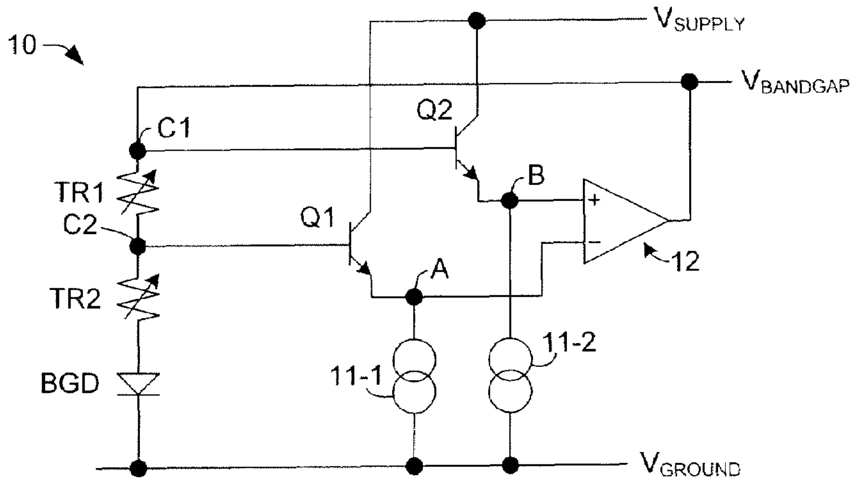
FIG. 6 (PRIOR ART)
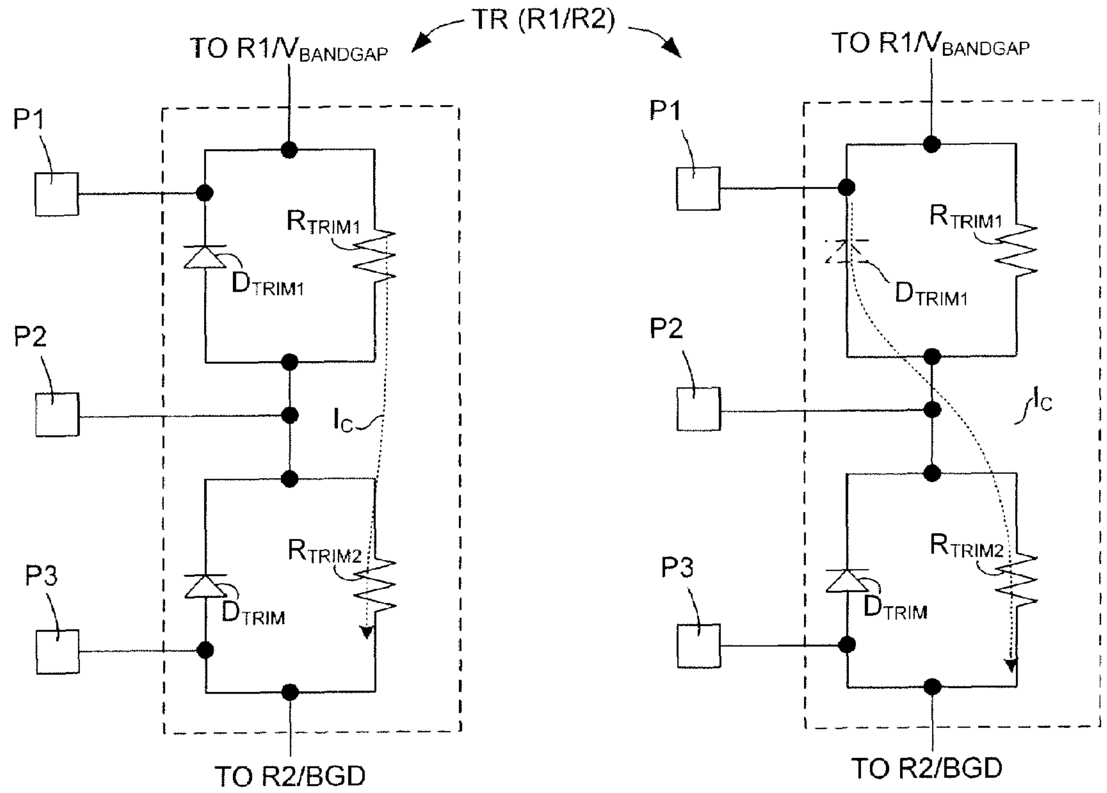
FIG. 7(A) (PRIOR ART)
FIG. 7(B) (PRIOR ART)

BANDGAP REFERENCE CIRCUITS WITH ISOLATED TRIM ELEMENTS

FIELD OF THE INVENTION

The present invention relates generally to bandgap reference circuits, and more particularly to an improved circuit for trimming bandgap reference circuits before wafer dicing and packaging.

BACKGROUND OF THE INVENTION

Electronic circuits often require a voltage reference that is stable and substantially constant over temperature and power supply variations. A bandgap reference circuit is typically used to generate such a temperature-independent and power-supply-independent reference voltage. A bandgap reference circuit typically generates a bandgap voltage of approximately 1.24 volts using two transistors operating at different current densities by developing a first voltage across the first transistor having a positive temperature coefficient and second voltage across the second transistor having a negative temperature coefficient, and then combining the two voltages to generate the temperature-independent bandgap voltage.

As with many integrated circuits (ICs), bandgap reference circuits require precise resistance values in order to generate the desired bandgap voltage. However, due to process variations inherent during the fabrication of all ICs, the actual resistance values on bandgap reference circuits can vary by as much as 15-20% from their intended value, resulting in undesirable temperature related variances in the bandgap voltage.

Trimming is a technique used to improve the accuracy and yield of bandgap reference circuits and other precision ICs. Trimming typically involves the selective addition or removal of resistive "trim" elements (e.g., resistors or other resistive elements) from the bandgap reference circuit in order to "tune" the circuit's operating characteristics. Specifically, after a bandgap reference circuit has been fabricated, trimming is sometimes carried out to modify the resistance values of the resistive elements that control the differential transistors, thereby bringing the bandgap voltage to within specification.

FIG. 6 is a simplified circuit diagram showing an exemplary bandgap reference circuit 10. Bandgap reference circuit 10 generally includes first and second differential transistors Q1 and Q2 that are respectively connected in series with current sources 11-1 and 11-2 between a voltage supply ($V_{SUPPLY}$) and a ground ($V_{GROUND}$). A node A between transistor Q1 and current source 11-1 is connected to the inverting (−) input terminal of an operational amplifier 12, and a node B between transistor Q2 and current source 11-2 is connected to the non-inverting (+) input terminal of amplifier 12. A bandgap voltage $V_{BANDGAP}$ is generated at the output terminal of amplifier 12, and is fed back to a third node C1, which is connected to the base of transistor Q2 and to the first terminal of a trimmable resistor TR1. Trimmable resistor TR1 is connected between node C1 and a node C2, which is connected to the base of transistor Q1, and is also connected to ground by way of a second trimmable resistor TR2 and a bandgap diode BGD.

FIGS. 7(A) and 7(B) are diagrams showing an exemplary conventional trimmable resistor TR (i.e., either trimmable resistors TR1 or TR2 of FIG. 6). Trimmable resistor TR includes resistors $R_{TRIM1}$ and $R_{TRIM2}$ that are respectively connected in parallel with zener diodes (or other one-time programmable trim elements) $D_{TRIM1}$ and $D_{TRIM2}$. External contact pads P1 to P3 are connected to trimmable resistor TR such that zener diode $D_{TRIM1}$ is connected between pads P1 and P2, and zener diode $D_{TRIM2}$ is connected between pads P2 and P3. In a first programmed state (e.g., as shown in FIG. 7(A)), both zener diodes $D_{TRIM1}$ and $D_{TRIM2}$ function normally to resist current flow in the direction of current path $I_C$, thereby forcing current path $I_C$ to flow through resistors $R_{TRIM1}$ and $R_{TRIM2}$. To reduce the resistance of trimmable resistor TR, one or both of zener diodes $D_{TRIM1}$ and $D_{TRIM2}$ are destroyed (sometimes referred to as "blown" or "zapped"), thereby creating a short circuit that bypasses the associated resistor $R_{TRIM1}$ or $R_{TRIM2}$. For example, as indicated in FIG. 7(B), a high voltage potential applied across pads P1 and P2 "blows" (short circuits) zener diode $D_{TRIM1}$, allowing current path $I_C$ to bypass resistor $R_{TRIM1}$, thereby effectively reducing the resistance of trimmable resistor TR by approximately the resistance of resistor $R_{TRIM1}$. Similarly, a high voltage potential applied across pads P2 and P3 would "blow" zener diode $D_{TRIM2}$, thereby effectively reducing the resistance of trimmable resistor TR by the resistance of resistor $R_{TRIM2}$.

FIG. 8(A) and 8(B) are side elevation and top plan views showing a conventional test/trim apparatus 20 positioned over a wafer 30 that includes multiple die 35 fabricated according to known techniques, where each die 35 includes one or more bandgap reference circuits 10 (indicated in FIG. 8(B)). Test/trim apparatus 20 is movable relative to wafer 30, and includes several probes 25 that are brought into contact with test/trim contact pads formed on a selected die (e.g., trim pads P1 to P3; see FIG. 7(A)). Specifically, during the conventional trimming procedure, test/trim apparatus 20 is positioned over a selected die, and then moved toward the selected die (as indicated by the arrows in FIG. 8(A)) such that probes 25 comes into contact with the test/trim contact pads formed on or adjacent to the selected die. Power is then transmitted to the selected die through selected probes 25, causing, for example, the bandgap reference circuit to generate bandgap voltage $V_{BANDGAP}$ in the manner described above. One of the probes passes the generated bandgap voltage $V_{BANDGAP}$ to a control circuit (not shown) that is operably coupled to test/trim apparatus 20, and the generated bandgap voltage $V_{BANDGAP}$ is compared with a stored value (sometimes referred to as a "magic number"). When the generated bandgap voltage $V_{BANDGAP}$ differs from the stored value, one or more of the trimmable resistors is trimmed in the manner described above to modify the effective resistance, thereby bringing the generated bandgap voltage $V_{BANDGAP}$ into compliance with the stored value. Test/trim apparatus 20 is then moved to a next die 35, and the process is repeated until all of the die 35 on wafer 30 are tested and trimmed.

As indicated in FIG. 9, a problem associated with the conventional test/trim procedure described above is that stray (parasitic) capacitances $C_S$ associated with test probes 25 of test/trim apparatus 20 significantly increases the response time of bandgap reference circuit 10, thereby significantly increasing the time required to perform the test/trim procedure. Due to the operating characteristics of bandgap reference circuit 10 (i.e., relatively high resistance values and relatively low currents), even a small additional capacitance applied to nodes C1 and C2 (i.e., to the terminals of trimmable resistors TR1 and TR2) can add a significant capacitance to bandgap reference circuit 10. Therefore, when probes 25 are connected to trim pads P1 to P3 (as depicted in a simplified manner in Fig. ZZ), stray capacitance $C_S$ becomes coupled to the bases of transistors Q1 and Q2, which control amplifier 12 to generate bandgap voltage $V_{BANDGAP}$, thereby causing a significant delay in the time required for bandgap reference circuit 10 to reach a stable operating condition suitable for performing the test/trim procedure. By increasing the time required to perform the test/trim procedure, overall manufacturing costs are increased, thereby reducing profits.

What is needed is method for reducing the amount of time required to perform a test/trim procedure by minimizing the delay introduced by stray capacitance applied by the test/trim apparatus probes to bandgap reference circuits. What is also needed is a bandgap reference circuit having trim elements that are arranged to facilitate the reduced-time test/trim procedure.

SUMMARY OF THE INVENTION

The present invention is directed to bandgap reference circuits having trim elements and associated trim pads that are isolated from critical nodes of the bandgap reference circuits by isolation elements (e.g., transistors), thereby minimizing the stray capacitance applied by test/trim apparatus probes to the critical nodes, thus reducing the amount of time required to perform a test/trim procedure. The critical nodes of the bandgap reference circuit are defined as the terminals (collector/source, emitter/drain, and base/gate) of the differential transistors. "Critical nodes" are nodes normally of high impedance and are in the feedback loop such that parasitic capacitance on the critical nodes can cause a degradation or loss of stability and can increase recovery time. The novel test/trim procedure is performed in substantially the same manner as conventional test/trim procedures (i.e., apply the test probes to the trim pads of the bandgap reference circuit, wait for the bandgap voltage to stabilize, compare the bandgap voltage with the stored "magic number" value, apply trimming currents (if required) to selected trim pads, and verify that the bandgap voltage is adjusted to equal the stored "magic number" value). However, because the stray capacitances of the test/trim apparatus probes are isolated from the critical nodes of the bandgap reference circuit, the bandgap voltage reaches a stable state in a substantially shorter amount of time, thereby allowing the test/trim procedure to be completed in a substantially shorter amount of time, thus reducing overall manufacturing costs.

In accordance with an embodiment of the present invention, a bandgap reference circuit includes at least one current source acting as or having an isolation transistor and a trim element that are connected in series between a critical node and ground. The isolation transistor is controlled to generate a predetermined current from the critical node through the trim element when the trim element is in a relatively low resistance state. Opposing terminals of the trim elements are connected to trim pads, which are also isolated from the critical node by the isolation transistor. The trim element is "trimmed" (i.e., caused to change from a relatively low resistive state to a relatively high resistive state, or vice versa), for example, by generating a current above a predetermined level between the trim pads. The bandgap voltage is adjusted to a desired level by selectively increasing or decreasing the current flow from the associated critical node during the test/trim procedure. Because the test/trim procedure is performed with the test/trim equipment probes separated from the critical nodes of the bandgap reference circuit by the isolation transistors, the bandgap voltage stabilizes in a substantially shorter amount of time than that produced using conventional test/trim procedures.

BRIEF DESCRIPTION OF THE DRAWINGS

These and other features, aspects and advantages of the present invention will become better understood with regard to the following description, appended claims, and accompanying drawings, where:

FIG. 6 is a simplified circuit diagram showing a conventional bandgap reference circuit;

FIGS. 7(A) and 7(B) are simplified circuit diagrams showing a conventional trimmable circuit;

DETAILED DESCRIPTION OF THE DRAWINGS

The present invention relates to an improvement in the test/trim procedure typically performed to optimize bandgap reference circuits. The following description is presented to enable one of ordinary skill in the art to make and use the invention as provided in the context of a particular bandgap reference circuit and its requirements, but unless otherwise specified, the claims are intended to cover all types of bandgap reference circuits. As used herein, "connected" is used herein to describe the substantially direct (i.e., metal trace or wire) connective relationship between two circuit elements of an integrated circuit, and is distinguished from the term "coupled", which indicates that the two separate elements may be separated by one or more intentionally-formed elements or components (e.g., diodes, transistors, or capacitors). Therefore, the present invention is not intended to be limited to the particular embodiments shown and described, but is to be accorded the widest scope consistent with the principles and novel features herein disclosed.

Figure 1:
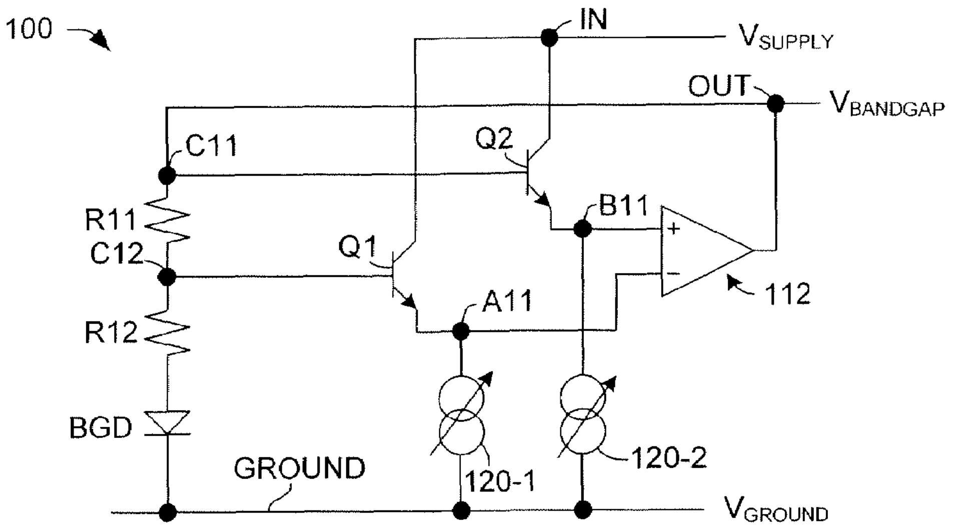
FIG. 1 is a simplified circuit diagram showing a bandgap reference circuit according to an embodiment of the present invention.

FIG. 1 is a simplified circuit diagram showing a bandgap reference circuit 100 according to an embodiment of the present invention. Similar to conventional bandgap reference circuits, bandgap reference circuit 100 generally includes first and second differential transistors Q1 and Q2 that are respectively connected in series with current control circuits 120-1 and 120-2 between a voltage supply ($V_{SUPPLY}$) and a ground ($V_{GROUND}$). Critical nodes of bandgap reference circuit 100 are defined at the various terminals of differential transistors Q1 and Q2. For example, a first critical node A11 is defined at the emitter (lower terminal) of transistor Q1, is connected to current source 120-1 and to the inverting (−) input terminal of an operational amplifier 112, and a second critical node B11 is defined at the emitter (lower terminal) of transistor Q2, and is connected to current control circuit 120-2 and to the non-inverting (+) input terminal of amplifier 112. A bandgap voltage $V_{BANDGAP}$ is generated at the output terminal of amplifier 112, and is fed back to a third critical node C1, which is connected to the base (gate terminal) of transistor Q2 and to the first terminal of a resistor R11. Resistor R11 is connected between critical node C1 and a fourth critical node C2, which is connected to the base (gate terminal) of transistor Q1, and is also connected to ground by way of a second resistor R12 and a bandgap diode BGD.

In the current embodiment, differential transistors Q1 and Q2 and resistors R11 and R12 are fabricated to produce a desired bandgap voltage $V_{BANDGAP}$ of approximately 1.24 at the output terminal of operational amplifier 112 using known techniques. However, as discussed above, variations in process parameters can result in component characteristics that generate bandgap voltage $V_{BANDGAP}$ at a voltage level that is greater than or less than the desired voltage level, thereby causing bandgap voltage $V_{BANDGAP}$ to fluctuate with changes in ambient temperature.

In accordance with the present invention, one or more current control circuits 120-1 and 120-2 are connected to at least one critical node (e.g., node All and/or node B11) of at least one of first and second differential transistors Q1 and Q2. Current control circuits 120-1 and 120-2 differ from current sources in that, as described below, current control circuits 120-1 and 120-2 include one or more trim elements that may be used to selective increase or decrease current flow from a selected critical node, thereby altering the electrical characteristics of bandgap reference circuit 100. Thus, current control circuits 120-1 and 120-2 facilitate "trimming" of the current sources used to generate current through differential transistors Q1 and Q2 in order to adjust bandgap voltage $V_{BANDGAP}$ to the desired voltage level.

Although two current control circuits 120-1 and 120-2 are illustrated in FIG. 1, one of these two current control circuits (e.g., current control circuit 120-1) may be replaced with a conventional current source (e.g., as depicted in conventional bandgap reference circuit 10; see FIG. 6). Those skilled in the art will recognize that, generally speaking, a relatively large number of trim elements provides greater control over the bandgap voltage adjustment during the test/trim procedure. However, it is possible to bias the fabrication process to produce, for example, an intentionally high initial bandgap voltage that may be adjusted to the specified voltage level by altering the current flow at only one critical node. Accordingly, unless otherwise specified, the appended claims are not limited to the multiple current control circuit arrangement illustrated in FIG. 1.

Figure 2:
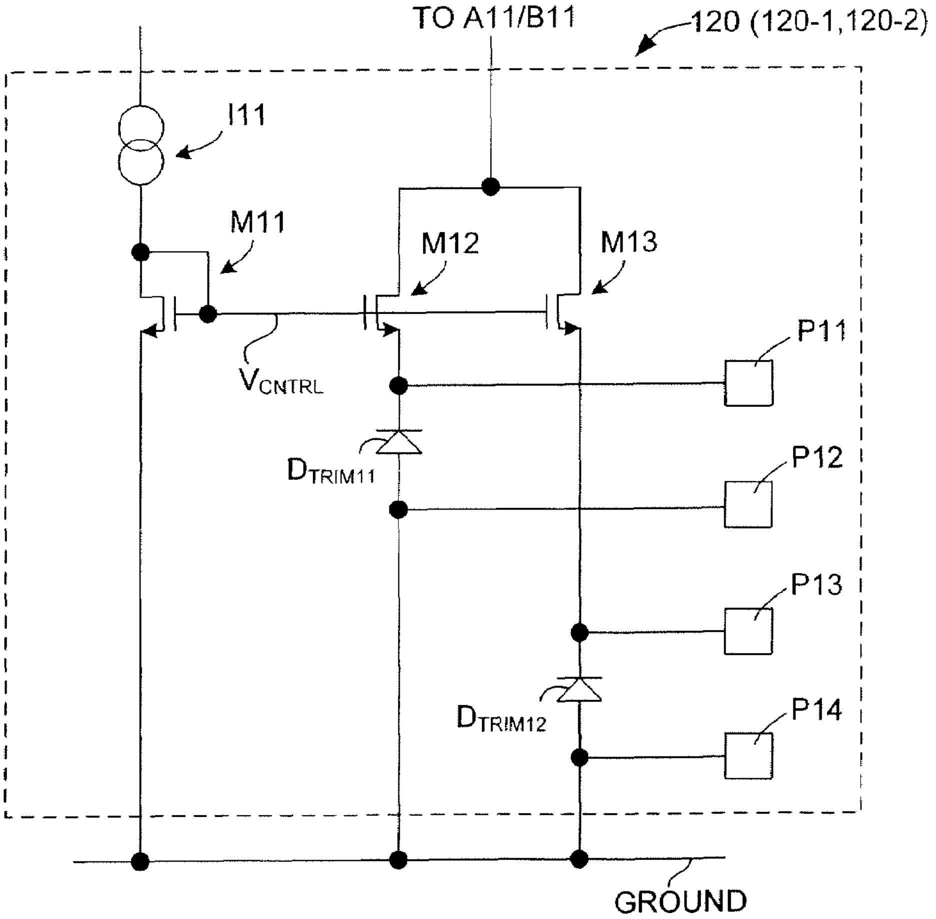
FIG. 2 is a simplified circuit diagram showing an exemplary current control circuit utilized in the bandgap reference circuit of FIG. 1.

FIG. 2 is a simplified circuit diagram showing an exemplary current control circuit 120, which may be utilized to implement either current control circuits 120-1 and 120-2 in bandgap reference circuit 100 (FIG. 1). Current control circuit 120 includes a control transistor M11 having a gate terminal and first terminal coupled to a current source I11, and a second terminal connected to ground. Control transistor M11 generates a fixed gate voltage that is applied to the gate terminals of isolation transistor M12 and M13, each of which having a first terminal connected to an associated critical node (i.e., A11 or B11; see FIG. 1). Resistive trim elements (e.g., zener diodes) $D_{TRIM11}$ and $D_{TRIM12}$ are connected between isolation transistors M12 and M113, respectively, and a ground voltage $V_{GROUND}$ (ground node GROUND). A pair of trim pads are respectively connected to opposing terminals of each trim element $D_{TRIM11}$ and $D_{TRIM12}$. In particular, trim pads P11 and P12 are connected to opposing (first and second) terminals of trim element $D_{TRIM11}$, and trim pads P13 and P14 are connected to opposing terminals of trim element $D_{TRIM12}$.

Similar to conventional trim elements, trim elements $D_{TRIM11}$ and $D_{TRIM12}$ are fabricated such that a current above a predetermined level that is generated between associated trim pads changes a resistance value of the trim element. In the present embodiment, before trimming, zener diodes $D_{TRIM11}$ and $D_{TRIM12}$ exhibit relatively high resistance to current flow from associated differential transistors Q1 and Q2 to ground. During the trimming process, a suitable current between trim pads P11 and P12 "blows" zener diode $D_{TRIM11}$, thereby reducing the resistance of trim element $D_{TRIM11}$, and effectively increasing current flow from critical node A11 to ground through isolation transistor M12 and "blown" trim element $D_{TRIM11}$. Similarly, a suitable current between trim pads P13 and P14 "blows" trim element $D_{TRIM12}$, thereby increasing current flow from critical node B11 to ground through isolation transistor M13 and "blown" trim element $D_{TRIM12}$. The increased current flow from critical nodes All or B11 decrease the operating voltages applied to operational amplifier 112, thereby altering the voltage level of bandgap voltage $V_{BANDGAP}$.

Figure 3:
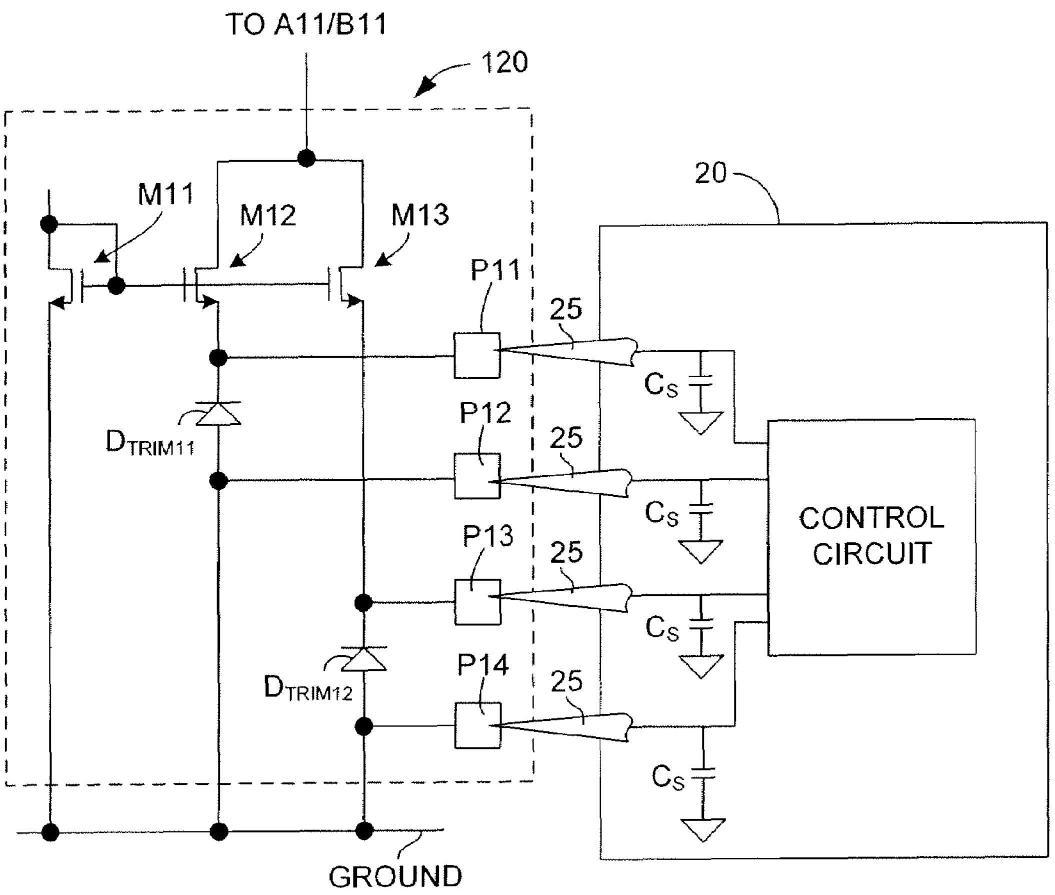
FIG. 3 is a simplified circuit diagram showing the exemplary current control circuit of FIG. 2 during a test/trim procedure performed on the bandgap reference circuit of FIG. 1.

By selectively trimming one or both trim elements $D_{TRIM11}$ and $D_{TRIM12}$ during the test/trim procedure, the electrical characteristics of bandgap reference circuit 100 can be adjusted using a test/trim procedure that is similar to the conventional test/trim procedure described above. However, as illustrated in FIG. 3, when test probes 25 of test/trim apparatus 20 are lowered onto trim pads P11-P14, the stray capacitance $C_S$ is essentially isolated from critical nodes A11 and/or B11 by isolation transistors M12 and M13. Because stray capacitance $C_S$ is thus isolated, the amount of time required for the bandgap voltage to stabilize and to perform the test/trim procedure is significantly reduced in comparison to the conventional test/trim procedure described above (i.e., one-fifth of the time). By significantly reducing the amount of time required to perform the test/trim procedure, overall production throughput is increased, thereby reducing overall manufacturing costs.

Although the present invention is described above with reference to certain preferred embodiments, the spirit and scope of the present invention may be implemented in other embodiments as well.

Figure 4:
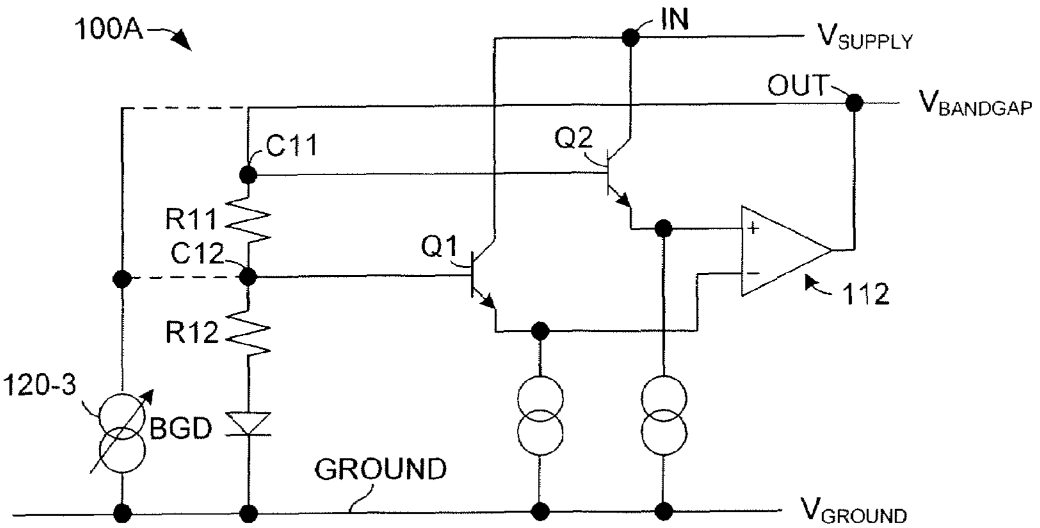
FIG. 4 is a simplified circuit diagram showing a bandgap reference circuit according to another embodiment of the present invention.

For example, FIG. 4 shows a bandgap reference circuit 100A wherein a current control circuit 120-3 is connected in parallel with the current path through resistors R11, R12 and bandgap diode BGD. In particular current control circuit 120-3, which is implemented using, for example, current control circuit 120 of FIG. 2 (described above), is connected to one of critical nodes C11 and C12 (as indicated by dashed lines). Trimming of the current through resistors R11 and R12 is performed in the manner described above to adjust the voltages applied to differential transistors Q1 and Q2.

Figure 5:
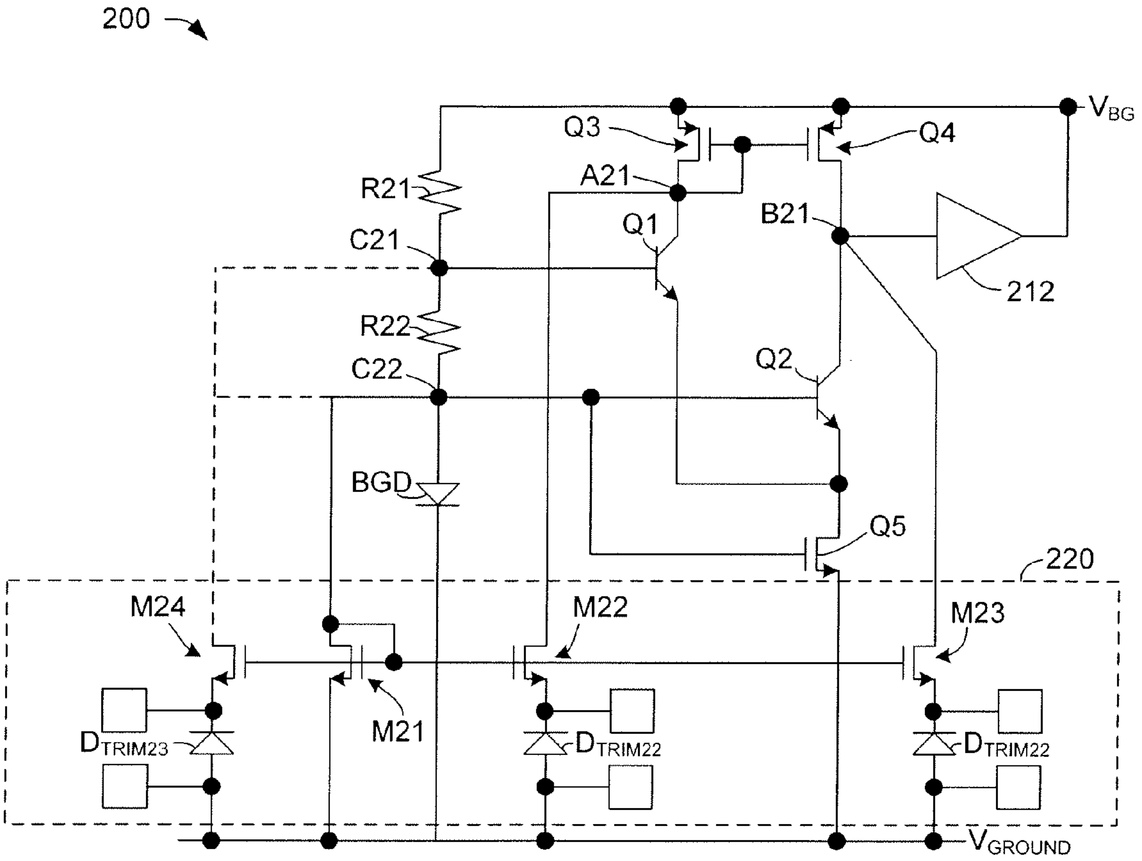
FIG. 5 is a simplified circuit diagram showing a bandgap reference circuit according to yet another embodiment of the present invention.
Figure 8A:
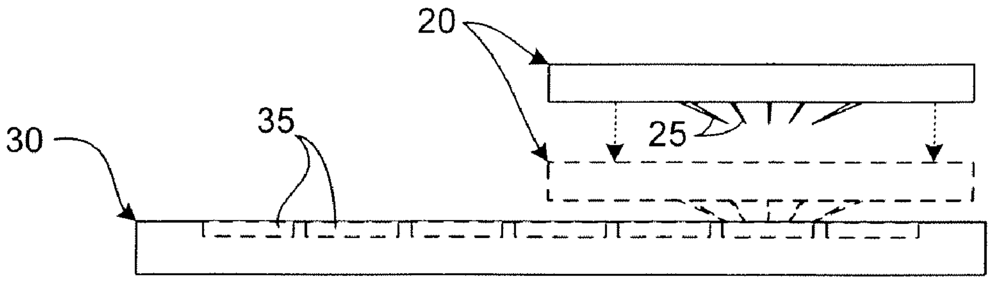
FIG. 8(A) (PRIOR ART)
FIG. 8(A) and 8(B) are side elevation and top plan views, respectively, showing a conventional test/trim apparatus and a wafer during a test/trim procedure.
Figure 8B:
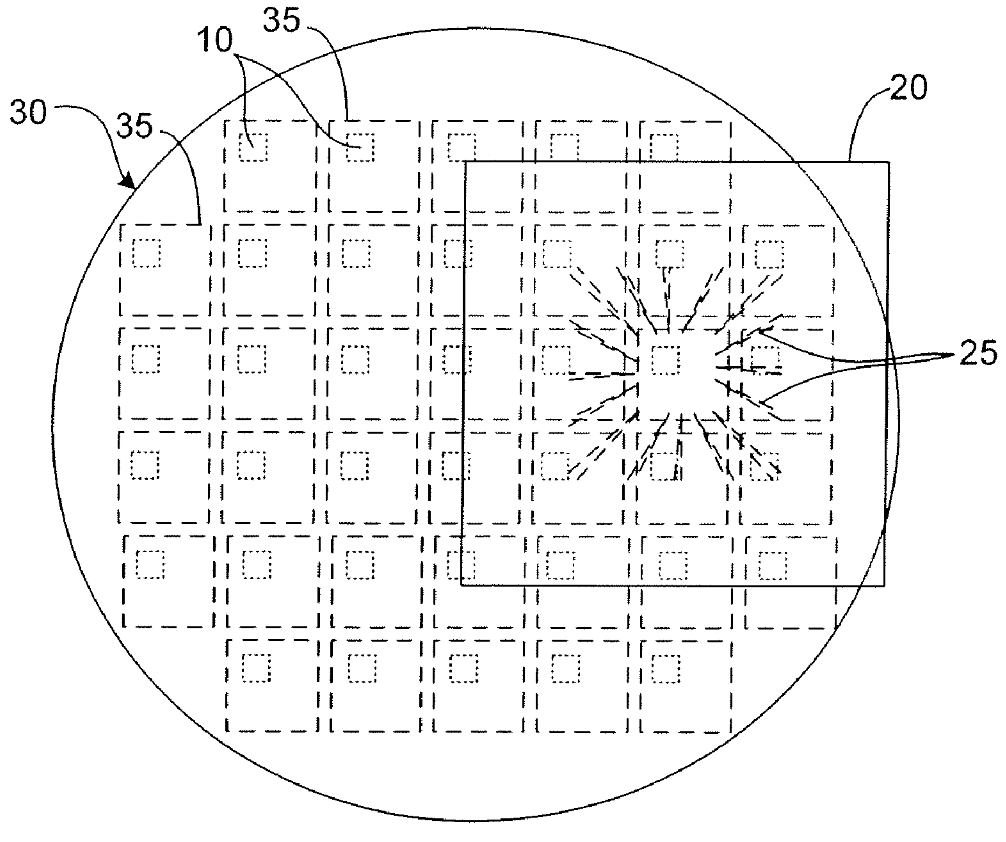
FIG. 8(B) (PRIOR ART)
Figure 9:
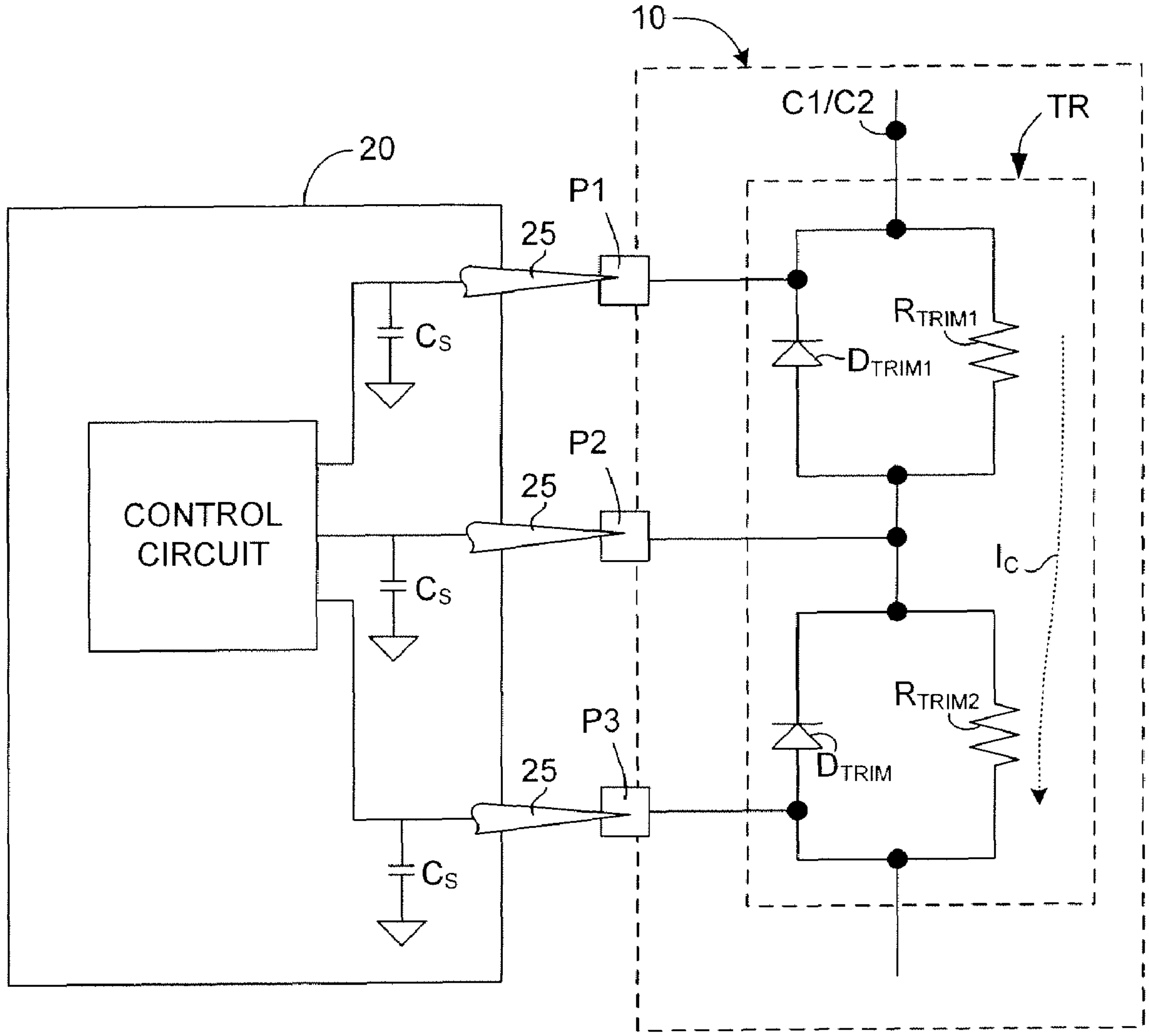
FIG. 9 (PRIOR ART)
FIG. 9 is a simplified circuit diagram showing the conventional trimmable circuit of FIG. 7(A) during a conventional test/trim procedure.

FIG. 5 shows a bandgap reference circuit 200 according to another alternative embodiment of the present invention. In this embodiment, first differential transistor Q1 is connected to bandgap voltage $V_{BG}$ by way of a critical node A21 and a transistor Q3, and second differential transistor Q2 is connected to bandgap voltage $V_{BG}$ by way of a critical node B21 and a transistor Q4. Critical node B21 is connected to the input of an amplifier 212 that generates bandgap voltage $V_{BG}$ at its output terminal. Transistor Q3 and Q4 are connected to form a current mirror. The emitters (lower terminals) of transistors Q1 and Q2 are connected to a current source formed by a transistor Q5. Bandgap voltage $V_{BG}$ is also passed through a first resistor R21 to a (third) critical node C21, which is connected to the base of differential transistor Q1. Critical node C21 is connected to a (fourth) critical node C22 by way of a second resistor R22. Critical node C22 is connected to the base of differential transistor Q2, to the gate terminal of transistor Q5, and to ground by way of a bandgap diode BGD. Bandgap reference circuit 200 also includes a current control circuit 220 that selectively controls the current at one or more of the critical nodes. Current control circuit 220 includes a current source formed by transistor M21, which is connected to critical node C22, and one or more isolation transistor M22, M23 and M24 that are driven by the base voltage of transistor M21. Similar to the arrangement described above, isolation transistor M22 is connected between critical node A21 and trim element $D_{TRIM21}$, and isolation transistor M23 is connected between critical node B21 and trim element $D_{TRIM22}$. Isolation transistor M24 is connected between one of critical nodes C21 and C22, and trim element $D_{TRIM23}$. Each of trim elements $D_{TRIM21}$, $D_{TRIM22}$, and $D_{TRIM23}$ is connected to an associated pair of trim pads, and are trimmed to produce a desired current flow in the manner described above.

Although the present invention has been described with respect to certain specific embodiments, it will be clear to those skilled in the art that the inventive features of the present invention are applicable to other embodiments as well, all of which are intended to fall within the scope of the present invention. For example, although the trim elements are specifically described herein as zener diodes, other programmable elements (e.g., fuse or antifuse) may be used in place of the disclosed trim elements.

The invention claimed is:

1. A bandgap reference circuit for generating a temperature-independent bandgap voltage, the bandgap reference circuit comprising:

first and second differential transistors, the first differential transistor having a first, relatively small size and operating at a relatively small emitter current density, and the second differential transistor having a second, relatively large size and operating at a relatively large emitter current density, wherein each terminal of said first and second differential transistors defines a critical node; and at least one current control circuit connected to at least one critical node of at least one of said first and second differential transistors, wherein said at least one current control circuit includes:

an isolation transistor having a first terminal connected to said at least one critical node, a gate terminal connected to a predetermined control voltage, and a second terminal;

a trim element having a first terminal connected to the second terminal of the isolation transistor, and a second terminal connected to the ground node; and first and second trim pads respectively connected to the first and second terminals of the trim element, wherein the trim element is formed such that a current above a predetermined level that is generated between the first trim pad and the second trim pad changes a resistance value of said trim element.

2. The bandgap reference circuit according to claim 1, wherein a first critical node is defined at a terminal of the first differential transistor, wherein a second critical node is defined at a terminal of the second differential transistor, and wherein said at least one current control circuit comprises:

a first current control circuit connected between the first critical node and the ground node, and a second current control circuit connected between the second critical node and the ground node.

3. The bandgap reference circuit according to claim 2, further comprising an amplifier having a first terminal connected to the first critical node, and a second terminal connected to the second critical node, wherein the temperature-independent bandgap voltage is generated at an output terminal of the amplifier.

4. The bandgap reference circuit according to claim 3, further comprising a first resistor having a first terminal defining a third critical node that is connected to the output terminal of the amplifier and to a base of the first differential transistor, and a second terminal defining a fourth critical node that is connected to a base of the second differential transistor.

5. The bandgap reference circuit according to claim 4, further comprising a second resistor and a diode connected in series between the second terminal of the first resistor and the ground node.

6. The bandgap reference circuit according to claim 4, further comprising a third current control circuit connected between one of the third and fourth critical nodes and the ground node.

7. The bandgap reference circuit according to claim 1, wherein a base of the second differential transistor defines a third critical node, wherein a base of the first differential transistor defines a fourth critical node, and wherein said at least one current control circuit is connected to at least one of the third critical node and the fourth critical node.

8. The bandgap reference circuit according to claim 1, wherein each trim element comprises a zener diode.

9. The bandgap reference circuit according to claim 1, wherein said at least one current control circuit comprises at least one of:

a first isolation transistor and a first trim element connected in series between a first critical node defined by a collector terminal of the first differential transistor;

a second isolation transistor and a second trim element connected in series between a second critical node defined by a collector terminal of the second differential transistor; and a third isolation transistor and a third trim element connected in series between one of a third critical node defined by a base terminal of the first differential transistor and a fourth critical node defined by a base terminal of the second differential transistor.

10. The bandgap reference circuit according to claim 9, wherein said at least one current control circuit further comprises a current source comprising a transistor having a source terminal and a gate terminal connected to the fourth critical node, and a drain terminal connected to the ground node.

11. The bandgap reference circuit according to claim 9, wherein the first and second differential transistors are connected to a current mirror, wherein the first critical node is defined between the first differential transistor and the current mirror, and the second critical node is defined between the first differential transistor and the current mirror, wherein the bandgap reference circuit further comprises an amplifier having an input terminal connected to the second critical node, said amplifier generating said temperature-independent bandgap voltage at an output terminal, and wherein said current mirror is connected between the output terminal of the amplifier and the first and second critical nodes.

* * * * *